(12) United States Patent
Uno

(10) Patent No.: US 9,152,554 B2
(45) Date of Patent: Oct. 6, 2015

(54) NON-VOLATILE MEMORY SYSTEM WITH COMPRESSION AND ENCRYPTION OF DATA

(71) Applicant: Kabushiki Kaisha Toshiba, Tokyo (JP)

(72) Inventor: Toru Uno, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 284 days.

(21) Appl. No.: 13/784,592

(22) Filed: Mar. 4, 2013

(65) Prior Publication Data

US 2014/0075098 A1    Mar. 13, 2014

(30) Foreign Application Priority Data

Sep. 7, 2012   (JP) ................................. 2012-197781

(51) Int. Cl.
*G06F 12/02* (2006.01)
*G06F 12/14* (2006.01)

(52) U.S. Cl.
CPC ........ *G06F 12/0246* (2013.01); *G06F 12/1408* (2013.01); *G06F 2212/401* (2013.01); *G06F 2212/402* (2013.01)

(58) Field of Classification Search
CPC .......... G06F 3/0623; G06F 2003/0691; G06F 12/0246; G06F 12/0253
USPC ........................................................ 711/103
See application file for complete search history.

(56) References Cited

U.S. PATENT DOCUMENTS

| | | | |
|---|---|---|---|
| 2008/0126749 A1* | 5/2008 | Tom et al. | 712/30 |
| 2009/0138671 A1 | 5/2009 | Danilak | |
| 2010/0161884 A1 | 6/2010 | Kurashige | |
| 2011/0055664 A1* | 3/2011 | Burd et al. | 714/768 |
| 2011/0296200 A1* | 12/2011 | Sibert | 713/189 |
| 2011/0320915 A1* | 12/2011 | Khan | 714/773 |
| 2012/0182163 A1 | 7/2012 | Cho et al. | |
| 2013/0073798 A1* | 3/2013 | Kang et al. | 711/103 |

FOREIGN PATENT DOCUMENTS

| | | |
|---|---|---|
| JP | 2011505046 | 6/2009 |
| JP | 2010152516 | 7/2010 |
| JP | 2012151840 | 8/2012 |
| WO | 2009070196 | 6/2009 |

* cited by examiner

*Primary Examiner* — Hal Schnee
(74) *Attorney, Agent, or Firm* — Patterson & Sheridan, LLP

(57) ABSTRACT

A memory system includes a non-volatile memory, a compressor capable of compressing data, an encryptor which encrypts data, a decryptor which decrypts data, and a data flow controller. The data flow controller is configured to perform first and second processes. In the first process, the data flow controller causes the encryptor to encrypt user data received from a host in a non-compressed state, and causes the encrypted user data to be written into the non-volatile memory via the second area. In the second process, the data flow controller causes the encrypted user data to be read out from the non-volatile memory, causes the decryptor to decrypt the encrypted user data, causes the compressor to compress the decrypted user data, causes the encryptor to encrypt the compressed user data, and causes the encrypted and compressed user data to be written into the non-volatile memory.

17 Claims, 12 Drawing Sheets

FIG. 4

| NAND PHYSICAL ADDRESS | STARTING LBA | SECTOR SIZE | COMPRESSED DATA SIZE | LBA MGMT MAP |
|---|---|---|---|---|
| NAND PHYSICAL ADDRESS | STARTING LBA | SECTOR SIZE | COMPRESSED DATA SIZE | LBA MGMT MAP |

. . . . . . . . . . . . .

NON-VOLATILE MEMORY SYSTEM WITH COMPRESSION AND ENCRYPTION OF DATA

CROSS-REFERENCE TO RELATED APPLICATION

This application is based upon and claims the benefit of priority from Japanese Patent Application No. 2012-197781, filed Sep. 7, 2012. The entire contents of which are incorporated herein by reference.

FIELD

Embodiments described herein relate generally to a memory system and a control method for the same.

BACKGROUND

Compression of data has been already considered in the field of non-volatile semiconductor storage devices such as SSD (Solid State Drive). Different data compression efficiencies are observed depending on the data pattern of user data. For example, in Huffman coding, which is a common reversible compression coding technique, different data patterns are detected and a short code is assigned to each data pattern according its frequency to perform compression. Huffman coding is applied in common compression protocols such as ZIP. That is, when compression based on Huffman coding is used, from a practical point of view, good compression efficiency is achieved with "data having a limited number of patterns" such as text files or "data formed by the same patterns" such as 0 padding data for padding of sector alignment.

DESCRIPTION OF THE DRAWINGS

FIG. 4 shows the configuration of a logical address (LBA) to physical address (NAND physical address) conversion table according to an embodiment.

DETAILED DESCRIPTION

Embodiments provide a memory system capable of encrypting user data and having excellent data compression efficiency and a control method for the same.

According to an embodiment, a memory system includes: a non-volatile memory; a compressor capable of compressing data; an encryptor which encrypts data; a decryptor which decrypts data; and a data flow controller configured to perform first and second processes. In the first process, the data flow controller causes the encryptor to encrypt user data received from a host in a non-compressed state, and causes the encrypted user data to be written into the non-volatile memory. In the second process, the data flow controller causes the encrypted user data to be readout from the non-volatile memory, causes the decryptor to decrypt the encrypted user data, causes the compressor to compress the decrypted user data, causes the encryptor to encrypt the compressed user data, and causes the encrypted and compressed user data to be written into the non-volatile memory.

Hereinafter, a memory system and a control method for the same according to an embodiment will be described in detail with reference to the accompanying drawings. However, the embodiments do not limit the invention.

Embodiment

Figure 1:
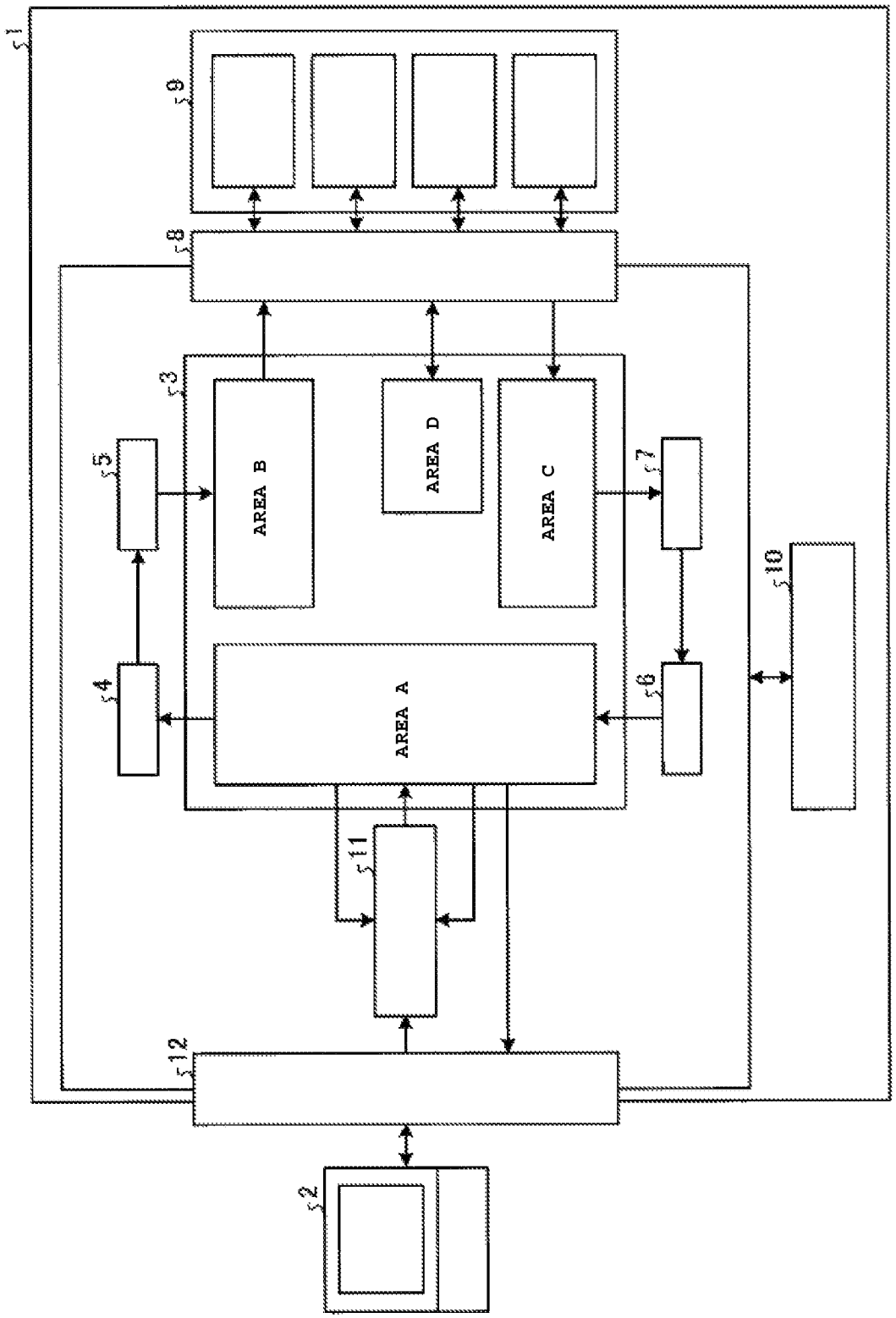
FIG. 1 shows a block diagram illustrating a configuration of an SSD according to an embodiment.

FIG. 1 shows a block diagram illustrating a configuration of an SSD 1 as a memory system according to this embodiment. The SSD 1 includes a host I/F 12 which mediates data transmission to and from a host device 2, a cache memory 3, a compressor 4, an encryptor 5, an expander 6, a decryptor 7, a NAND flash memory I/F 8, a NAND flash memory 9, and a data flow controller 10 which controls each component within the SSD 1. The compression process in the compressor 4 uses Huffman coding. Therefore, the SSD 1 further includes a pattern tracking unit 11 which tracks the frequency of data patterns.

User Data Writing Process

Figure 6:
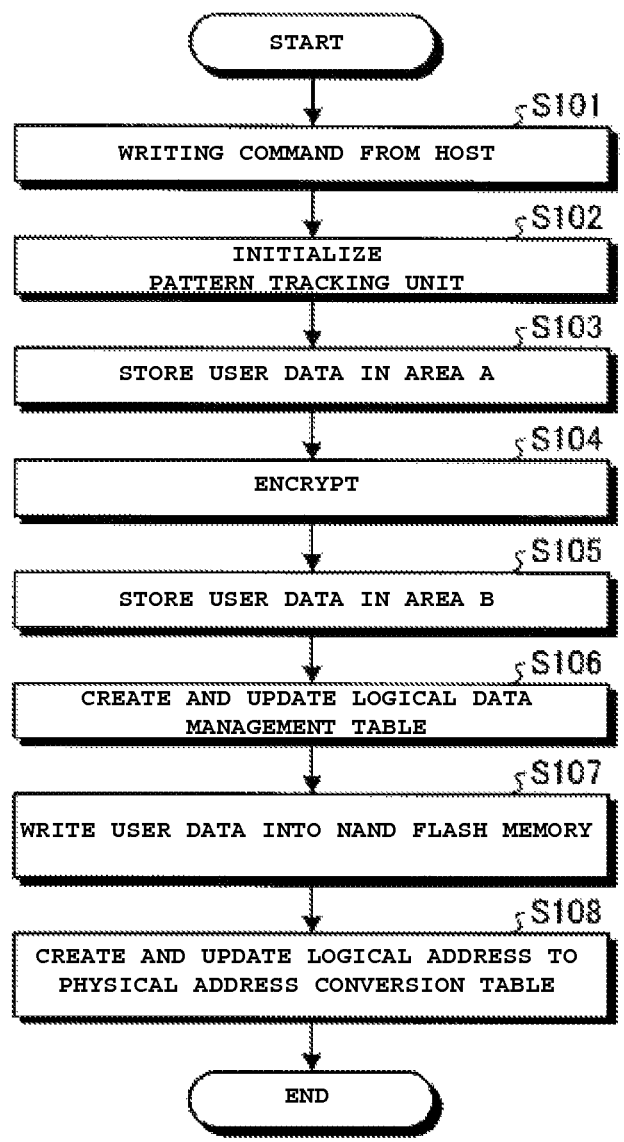
FIG. 6 is a flowchart for explaining a user data writing process according to an embodiment.

A user data writing process controlled by the data flow controller 10 will be described with reference to the flowchart in FIG. 6. The host device 2 requests the SSD 1 to carry out the user data writing process (step S101). The data flow controller 10 initializes the pattern tracking unit 11 (step S102), and then causes the SSD 1 to receive user data from the host device 2 via the host I/F 12. The frequency of data patterns of the user data is tracked by the pattern tracking unit 11, and then the user data is stored in an area A in the cache memory 3 (step S103).

When a prescribed volume of user data is stored in the area A in the cache memory 3, or when the final user data requested by the host device 2 to be written is stored, the user data takes a path including the compressor 4 and the encryptor 5 (step S104) and is stored again in the cache memory 3. However, the user data is now stored in an area B, which is different from the area A (step S105). Each of the area A (first area), the area B (second area) and an area C (third area), later described, in the cache memory 3 may be configured in the form of a ring buffer. The frequency of data patterns tracked by the pattern tracking unit 11 is not finalized until the final user data requested by the host device 2 to be written is stored in the area A in the cache memory 3. That is, since the tracking of the frequency of data patterns is still in progress, the compressor 4 does not carry out compression. However, encrypting by the encryptor 5 is executed on the user data stored in the area A and then stored in the area B after encrypting (step S104). The user data stored in the area B in the cache memory 3 in encrypted form is erased from the area A. By erasing the user data from the area A, it become possible to receive the next user data transferred from the host device 2.

Figure 2:
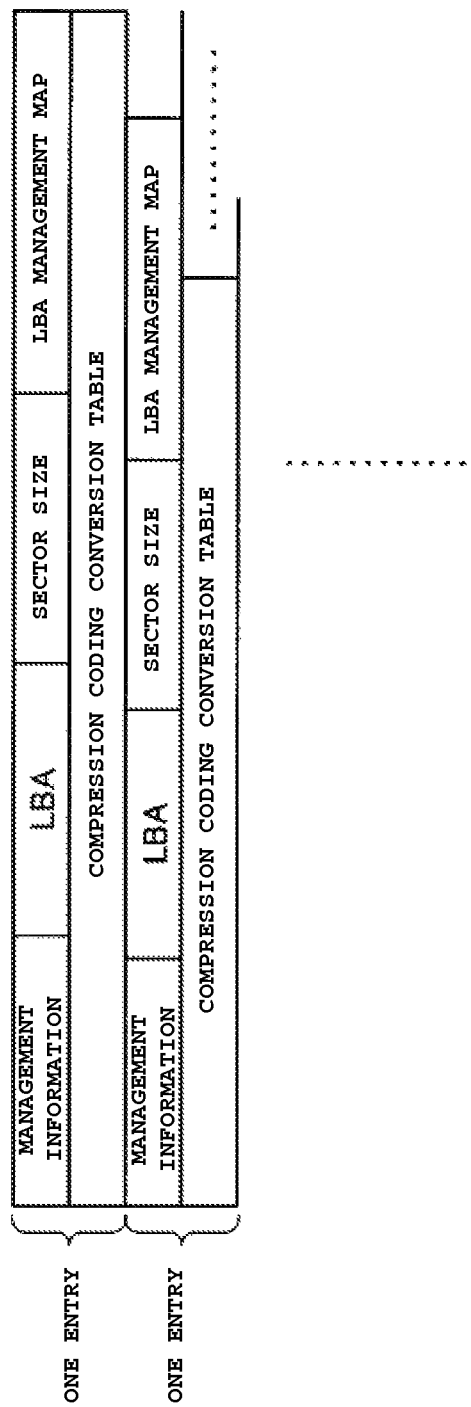
FIG. 2 shows the configuration of a logical data management table according to an embodiment.

The frequency of data patterns is finalized only when user data to be written in response to a command from the host device 2 is transferred in a requested amount (an amount designated by one writing command). After the finalization, the data pattern frequency result is written into a "compression coding conversion table" which is appended to a "logical data management table" for one entry shown in FIG. 2. Using this table, data conversion by compression is carried out. Therefore, the frequency result of the "compression coding conversion table" for an entry will change according to data patterns appearing in the data associated with the entry. When a writing command arrives from the host device 2, the data flow controller 10 constructs one entry of the "logical data management table" in FIG. 2 including "LBA", "sector size" and "compression code conversion table" respectively corresponding to LBA information and number of sectors information requested by the host device 2 and the data pattern frequency, in an area D in the cache memory 3 (step S106). The area D is a different area from the area A, the area B, and the area C, later described. A "LBA management map" in the logical data management table in FIG. 2 is made up of an LBA valid flag (a flag indicating whether this LBA is valid or invalid) corresponding to the sector size from the starting LBA, and varies in length depending on "sector size". Since the user data writing is new, the "LBA management map" shows that all the LBAs are valid. However, thereafter, an invalid flag is set with respect to an LBA that is invalidated by a DATA SET MANAGEMENT (TRIM) command (hereinafter referred to as a TRIM command) which is a command for invalidating data defined as a command on the ATA standards or the like. Also, as "management information", information showing whether data is non-compressed or compressed and size information corresponding to one entry in the "logical data management table" are registered.

Figure 3:
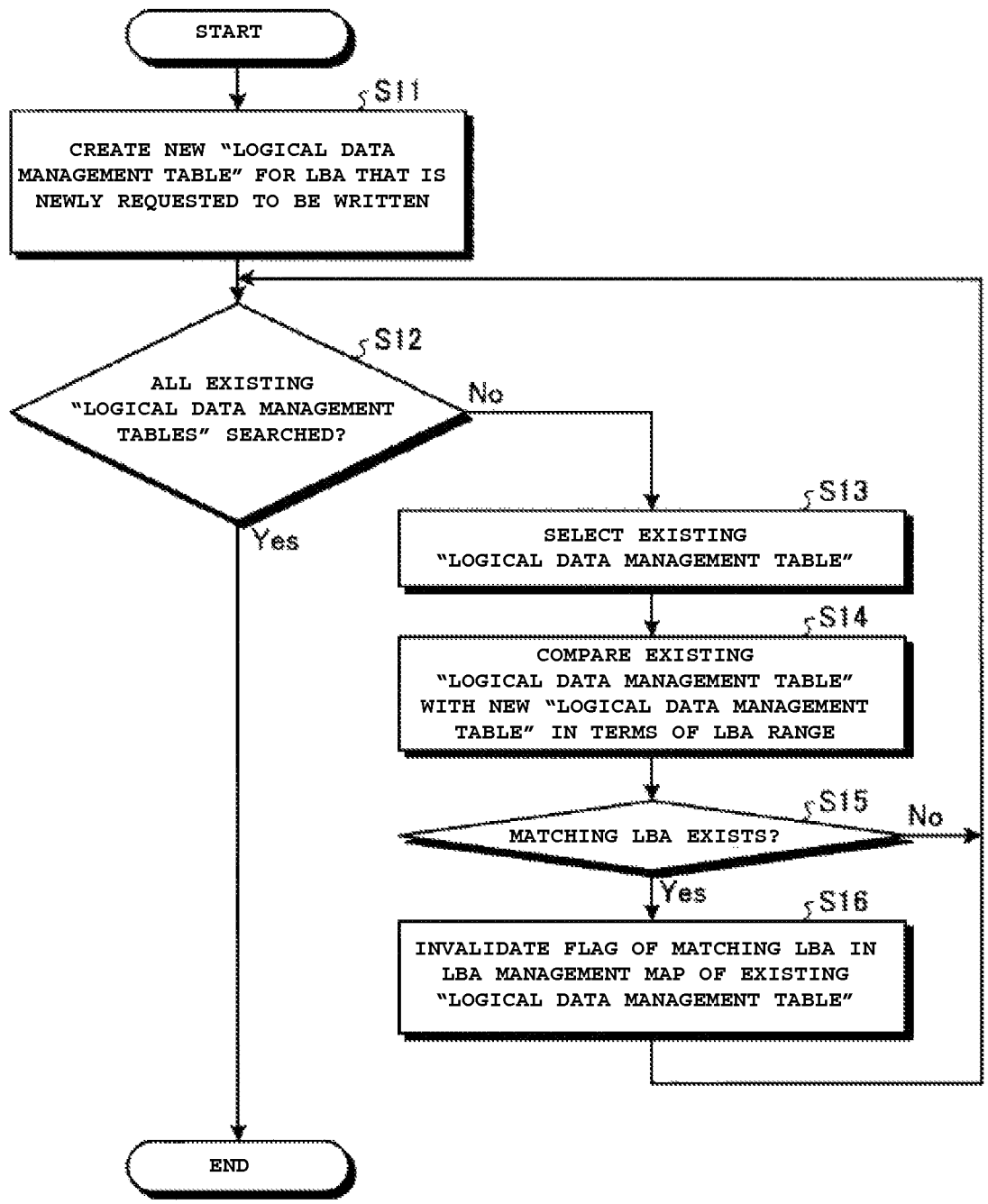
FIG. 3 is a flowchart showing details of a process to create and update a logical data management table according to an embodiment.

After that, the data flow controller 10 searches all the logical data management tables that are already registered. When overwriting an LBA in which data is already written, that is, when an LBA in which data is already written and the LBA requested in a writing command from the host device 2 overlap each other, the "LBA management map" is updated with respect to the logical data management table having the overlapping LBA, and the LBA valid flag is invalidated for the overlapped LBA of this time. The flowchart in FIG. 3 shows details of procedures to create and update a "logical data management table" (step S106). First, a new "logical data management table" is created for an LBA that is newly requested to be written (step S11). Next, whether all the existing "logical data management tables" are searched or not is determined (step S12). If not all the existing "logical data management tables" are searched (step S12: No), one of the unsearched "logical data management tables" is selected (step S13) and compared with the new "logical data management table" (step S14). If there are no matching LBAs (step S15: No), the process returns to step S12. If there is a matching LBA (step S15: Yes), the LBA valid flag of the matching LBA in the "LBA management map" of the existing "logical data management table" is invalidated (step S16) and the process returns to step S12. If all the existing "logical data management tables" are searched in step S12 (step S12: Yes), step S106 in FIG. 6 ends.

When a prescribed volume of user data is stored in the area B in the cache memory 3 after encrypting or when the final user data requested to be written by the host device 2 is stored therein after encrypting, the data flow controller 10 writes the encrypted user data stored in the area B into the NAND flash memory 9 (step S107). Then, when the final user data requested by the host device 2 to be written is written into the NAND flash memory 9, the logical data management table constructed in the area D is written into the NAND flash memory 9.

Then, an "LBA management map" in a "logical address (LBA) to physical address (NAND physical address) conversion table" shown in FIG. 4, similarly constructed in the area D, is updated and written into the NAND flash memory 9 (step S108). The "logical address (LBA) to physical address (NAND physical address) conversion table" shows the correspondence between NAND physical address and data logical address (LBA) for each page of the chip of the NAND flash memory 9. The "LBA management map" in each table is made up of an LBA valid flag corresponding to the "sector size" from a "starting LBA" but has a fixed length. "Compressed data size" records the size of compressed sector data starting with the registered LBA. In the case of this embodiment, the size of data is recorded even if the data is non-compressed. When an LBA is not allocated to a NAND physical address (that is, when the NAND physical address is a free area), the starting LBA value may be identified as an arbitrary undefined attribute value, or the "sector size" may be identified as 0. When overwriting an LBA in which data is already written, that is, when an LBA in which data is already written and the LBA requested in the writing command from the host device 2 overlap each other, with respect to the "logical address (LBA) to physical address (NAND physical address) conversion table" having the overlapping LBA, the overlapped LBA is invalidated and the "LBA management map" is updated, or the "LBA management map" is updated and the overlapped LBA is invalidated (step S108).

Figure 5:
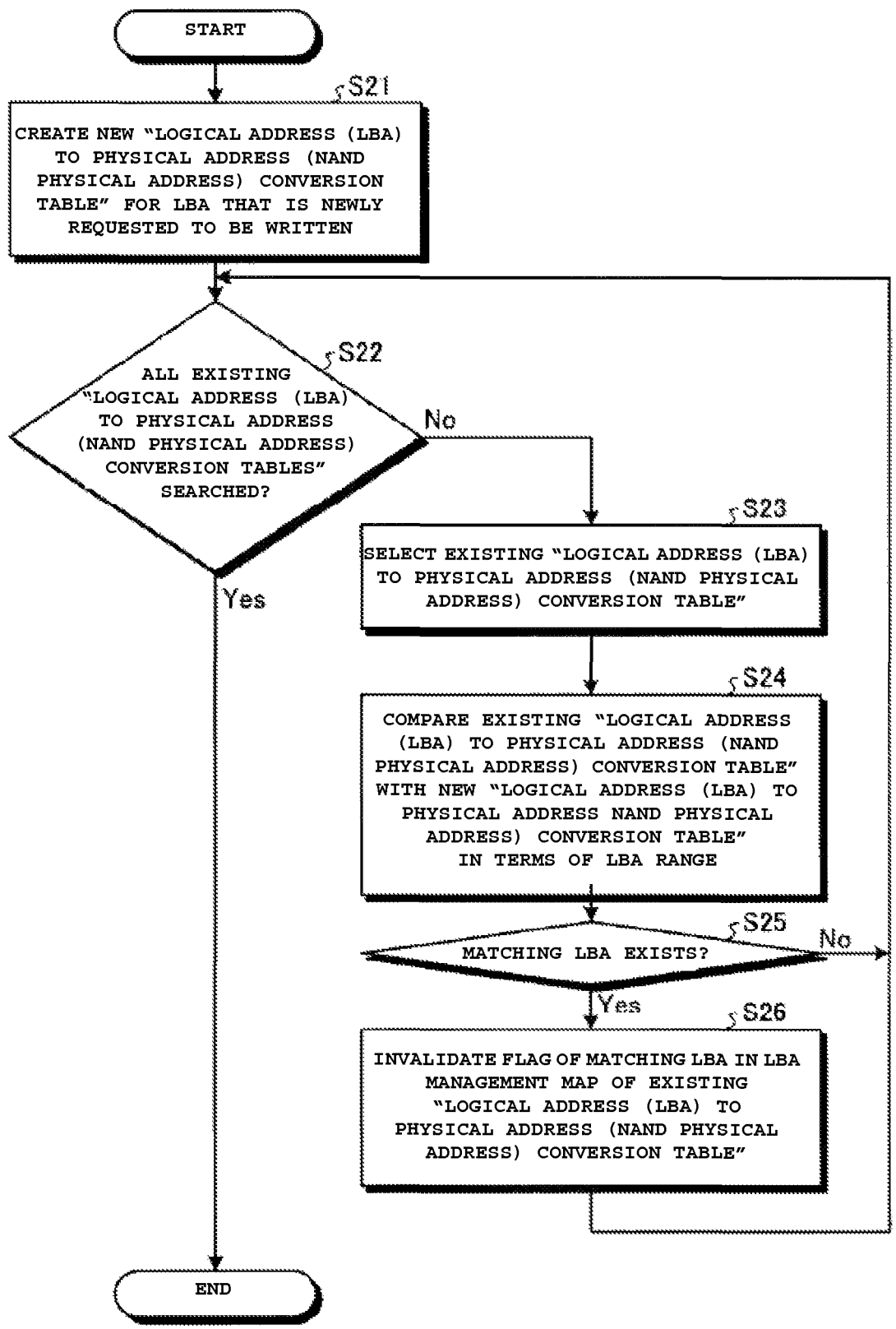
FIG. 5 is a flowchart showing details of a process to create and update a logical address (LBA) to physical address (NAND physical address) conversion table according to an embodiment.

In this way, the "logical address (LBA) to physical address (NAND physical address) conversion table" is managed so that overlapping valid LBAs do not exist. The flowchart in FIG. 5 shows the procedure of step S108. First, a new "logical address (LBA) to physical address (NAND physical address) conversion table" is created for an LBA which is newly requested to be written (step S21). Next, whether all the existing "logical address (LBA) to physical address (NAND physical address) conversion tables" are searched or not is determined (step S22). If not all the existing "logical address (LBA) to physical address (NAND physical address) conversion tables" are searched (step S22: No), one of the unsearched "logical address (LBA) to physical address (NAND physical address) conversion tables" is selected (step S23) and compared with the new "logical address (LBA) to physical address (NAND physical address) conversion table" (step S24). If there are no matching LBAs (step S25: No), the process returns to step S22. If there is a matching LBA, (step S25: Yes), the LBA valid flag of the matching LBA in the "LBA management map" of the existing "logical address (LBA) to physical address (NAND physical address) conversion table" is invalidated (step S26) and the process returns to step S22. If all the existing "logical address (LBA) to physical address (NAND physical address) conversion tables" are searched in step S22 (step S22: Yes), step S108 in FIG. 6 ends.

When the above series of processes is completed, the area D may be erased from the cache memory 3 or may be used as a user data cache.

User Data Compression Process

In the SSD 1, an optimizing process of a recorded user data area called wear leveling or compaction is carried out. Such a process is usually carried out as a background process in the SSD 1. In this embodiment, too, a compression process of the above recorded user data in the non-compressed state is carried out as a background process in the SSD 1.

Figure 7:
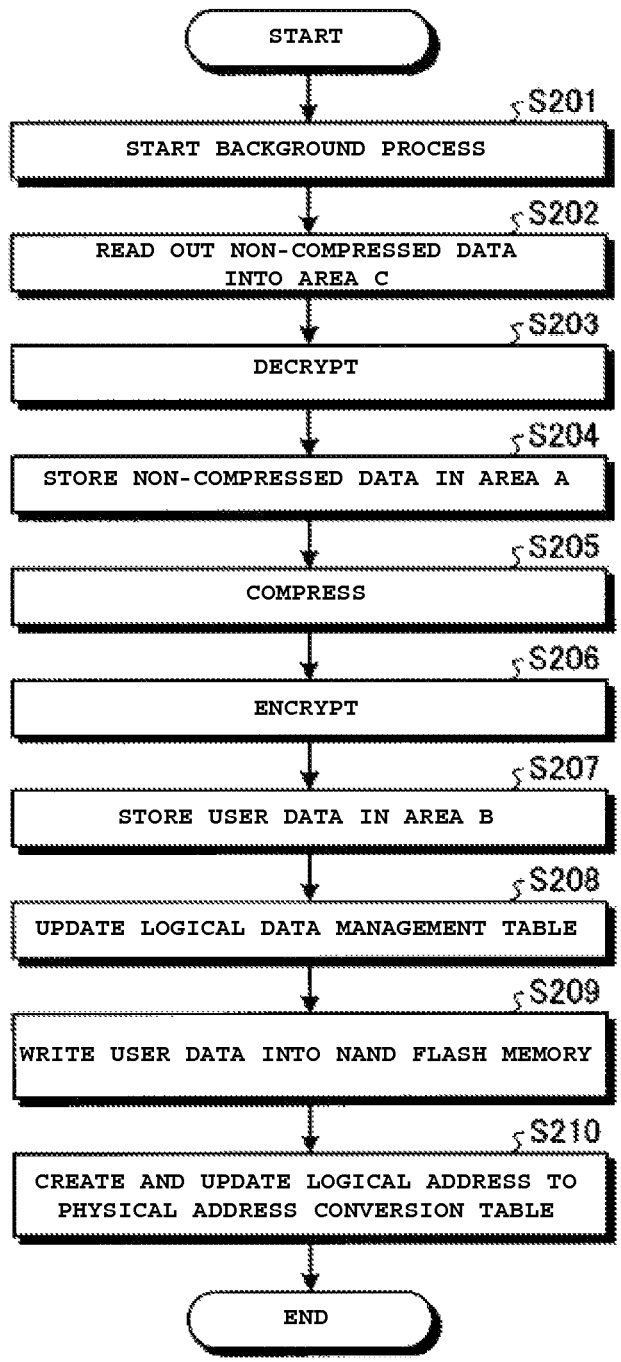
FIG. 7 is a flowchart for explaining a user data compression process according to an embodiment.

Hereinafter, the user data compression process controlled as a background process by the data flow controller 10 will be described with reference to the flowchart in FIG. 7. Triggered by a pause for a predetermined period (for example, N seconds) in the data access command to the SSD 1 from the host device 2, the background process is started inside the SSD 1 (step S201).

First, non-compressed data is extracted, referring to the "logical data management table" in FIG. 2. Then, referring to the "logical address (LBA) to physical address (NAND physical address) conversion table" in FIG. 4 with respect to a compression-incomplete LBA, the corresponding data is read out into the area C in the cache memory 3 from the NAND flash memory 9 via the NAND flash memory I/F 8 (step S202). Then, the encrypted user data that is read out is decrypted by the decryptor 7 (step S203), then processed by the expander 6 and stored in the area A in the cache memory 3 (step S204). Since the data is in the non-compressed data, the state does not change even when the data is processed by the expander 6. Then, the "compression coding conversion table" attached to the "logical data management table" in FIG. 2 is set in the compressor 4 and the user data in the area A is compressed by the compressor 4 (step S205). Then, the data is encrypted by the encryptor 5 (step S206).

Figure 10:
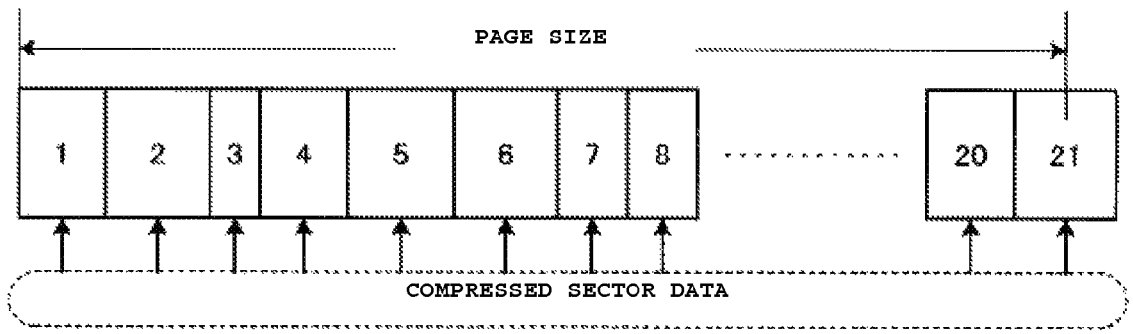
FIG. 10 is an explanatory view showing a layout of compressed data according to an embodiment.
Figure 11:
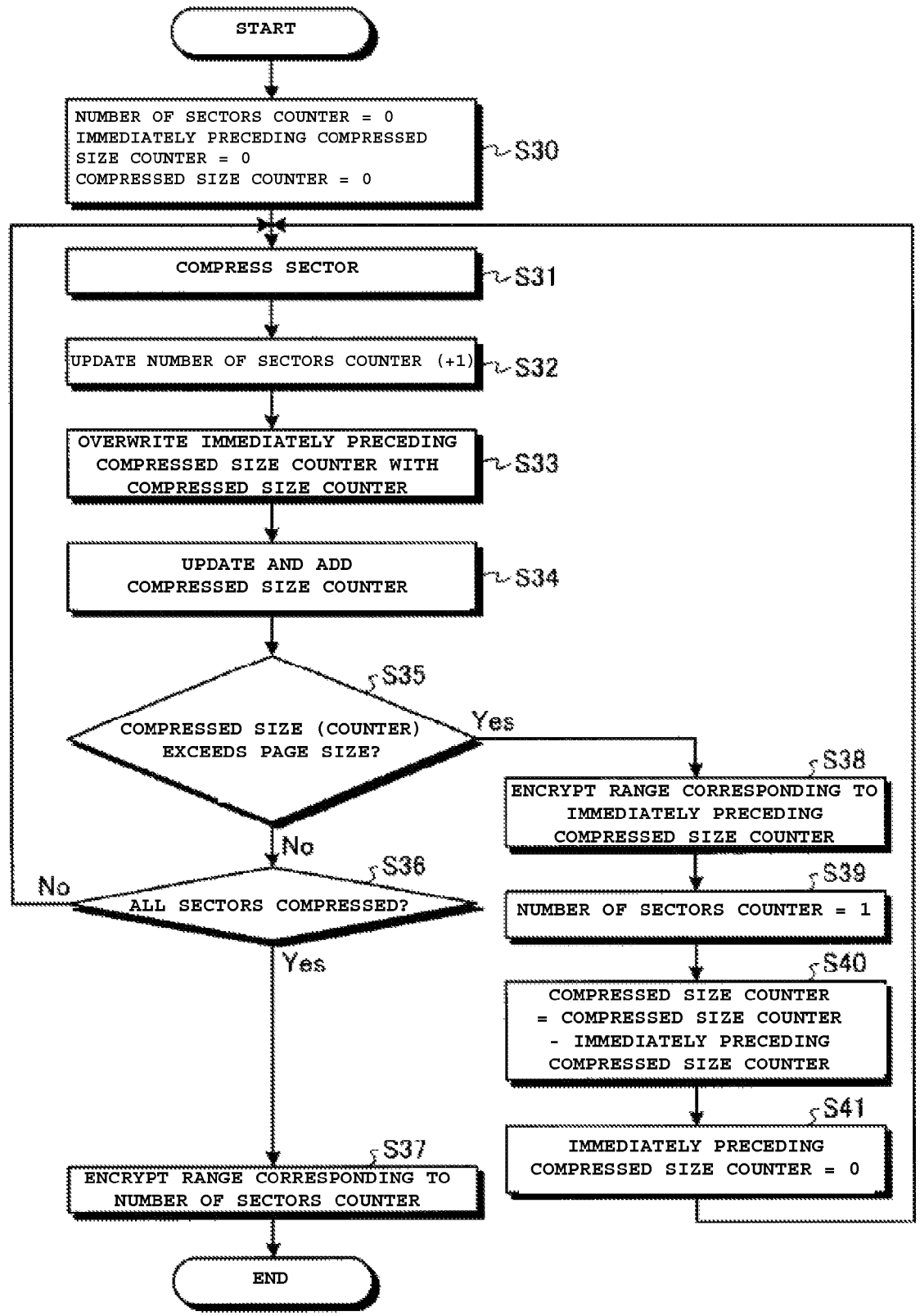
FIG. 11 is a flowchart for explaining details of compression and encrypting processes according to an embodiment.

The compression of step S205 is carried out as shown in FIG. 10 and FIG. 11 in order to align the compressed data with the size of the block used in the subsequent encrypting process. In this embodiment, it is assumed that the page size itself is aligned with the block size of data in the encrypting process. FIG. 10 shows a compressed data layout for each recording unit (page unit) in the NAND flash memory 9. If the data size after compression in which the total sector size is aligned with the block size of the encrypting process is equal to or smaller than the page size, which is a recording unit in the NAND flash memory 9, the data can be stored in the same page. The size after compression of each sector is not constant. However, in FIG. 10, for example, sectors 1 to 20 are stored in one page, and sectors 21 and after are stored in the next allocated page.

This process is explained in the flowchart in FIG. 11 showing details of the compression and encrypting processes. The total size of compressed data is calculated, and if the data exceeds the page size, the compressed data up to the sector immediately before the excess data is taken as a unit to be encrypted. Since arbitrary data is added by the encryptor 5 as padding data for alignment with block size in the encrypting process, encrypted data including the padding data is used as a target to be recorded in the NAND flash memory 9. Specifically, first, in step S30, a "number of sectors counter", an "immediately preceding compressed size counter" and a "compressed size counter" in the compressor 4 are each reset to 0. Then, the compressor 4 first compresses data corresponding to one sector (step S31), and the "number of sectors counter" is incremented by 1 (step S32). The value of the "immediately preceding compressed size counter" is overwritten with the value of the "compressed size counter" (step S33). Moreover, the data size after compression of data corresponding to one sector in step S31 is added to the value of the "compressed size counter" (step S34). Since the size after compression of each sector is not constant as described above, the added value here is not constant. For example, if data of 512 bytes per sector is compressed to 100 bytes in step S31, the added value to the "compressed size counter" is 100 bytes.

Then, if the value of the "compressed size counter" exceeds the page size (step S35: Yes), the compressed data indicated by the "immediately preceding compressed size counter" is encrypted by the encryptor 5 (step S38). That is, if the data exceeds the page size, the compressed data up to the sector immediately before the excess data is taken as a unit to be encrypted. After that, the "number of sectors counter" is set to 1 (step S39) and the value of the ("compressed size counter"—"immediately preceding compressed size counter") is written into the "compressed size counter" (step S40). The "immediately preceding compressed size counter" is reset to 0 (step S41) and the process returns to step S31 to compress the next sector.

Meanwhile, if the value of the "compressed size counter" is equal to or smaller than the page size in step S35 (step S35: No), whether all the sectors are compressed or not is determined (step S36). If not all the sectors are compressed yet (step S36: No), the process returns to step S31 to compress the next sector. If all the sectors are compressed (step S36: Yes), the compressed data corresponding to the "number of sectors counter" is encrypted by the encryptor 5 (step S37) and step S206 in FIG. 7 ends.

The frequency of data patterns stored in the "compression coding conversion table" can be replaced by the new frequency determined by the pattern tracking unit 11 at the time of step S204 when the data is stored in the area A. The encrypted user data is stored in the area B in the cache memory 3 (step S207). Then, the state of the "management information" in the "logical data management table" in FIG. 2 stored in the area D with respect to the encrypted user data is updated to be in a state of being compressed (step S208). The "logical address (LBA) to physical address (NAND physical address) conversion table" in FIG. 4, similarly stored in the area D, is updated and the user data is written into a new area in the NAND flash memory 9 (at the same time, the area in the NAND flash memory 9 before the writing is updated so that the registration in the "logical address (LBA) to physical address (NAND physical address) conversion table" is cleared or the "LBA management map" becomes a free area). Then, the encrypted user data in the area B is written into the NAND flash memory 9 via the NAND flash memory I/F 8 (step S209). Also, to reflect the updated state of the area D, the state of the "logical data management table" in the NAND flash memory 9 is updated as a state of being compressed, and writing into the "logical address (LBA) to physical address (NAND physical address) conversion table" in the NAND flash memory 9 is executed (step S210).

As described above, in this embodiment, when there is room in the operation capacity of the SSD 1, such as when the data access command from the host device 2 to the SSD 1 is paused for a predetermined period (for example, N seconds), user data is compressed and then encrypted. In data compression using Huffman coding or the like, compression after encrypting makes it difficult to raise compression efficiency. For example, in the case of a TCG Opal device, where TCG Opal is a specification for storage devices published by the Trusted Computing Group, user data needs to be encrypted, and even the simple pattern data as described above is randomized by the encrypting. For example, AES256XTS mode is a mainstream storage encrypting method being used recently. This method realizes randomization of each AES256 block (128 bits). Even the same plaintext pattern (All "0" data or the like) is randomized on a unit of an AES256 block. Therefore, there is a concern over deterioration in compression efficiency. However, according to this embodiment, particularly in an SSD device having both a "user data encrypting function" and a "user data self-compressing function" as to support the TCG Opal specification, encrypting with improved data compression efficiency can be realized.

Here, the data compression process is described as being carried out as a background process in the SSD 1. However, since the frequency of data patterns tracked by the pattern tracking unit 11 is finalized at the time when the final user data requested by the host device 2 is stored in the area A in the cache memory 3, as described above, compression can be carried out at this time. Therefore, when writing of user data is requested by the host device 2, the data may be compressed immediately after the frequency of data patterns is finalized so that the data is encrypted and stored in the NAND flash memory 9. The SSD 1 in FIG. 1 has a system configuration that enables this process.

Figure 12:
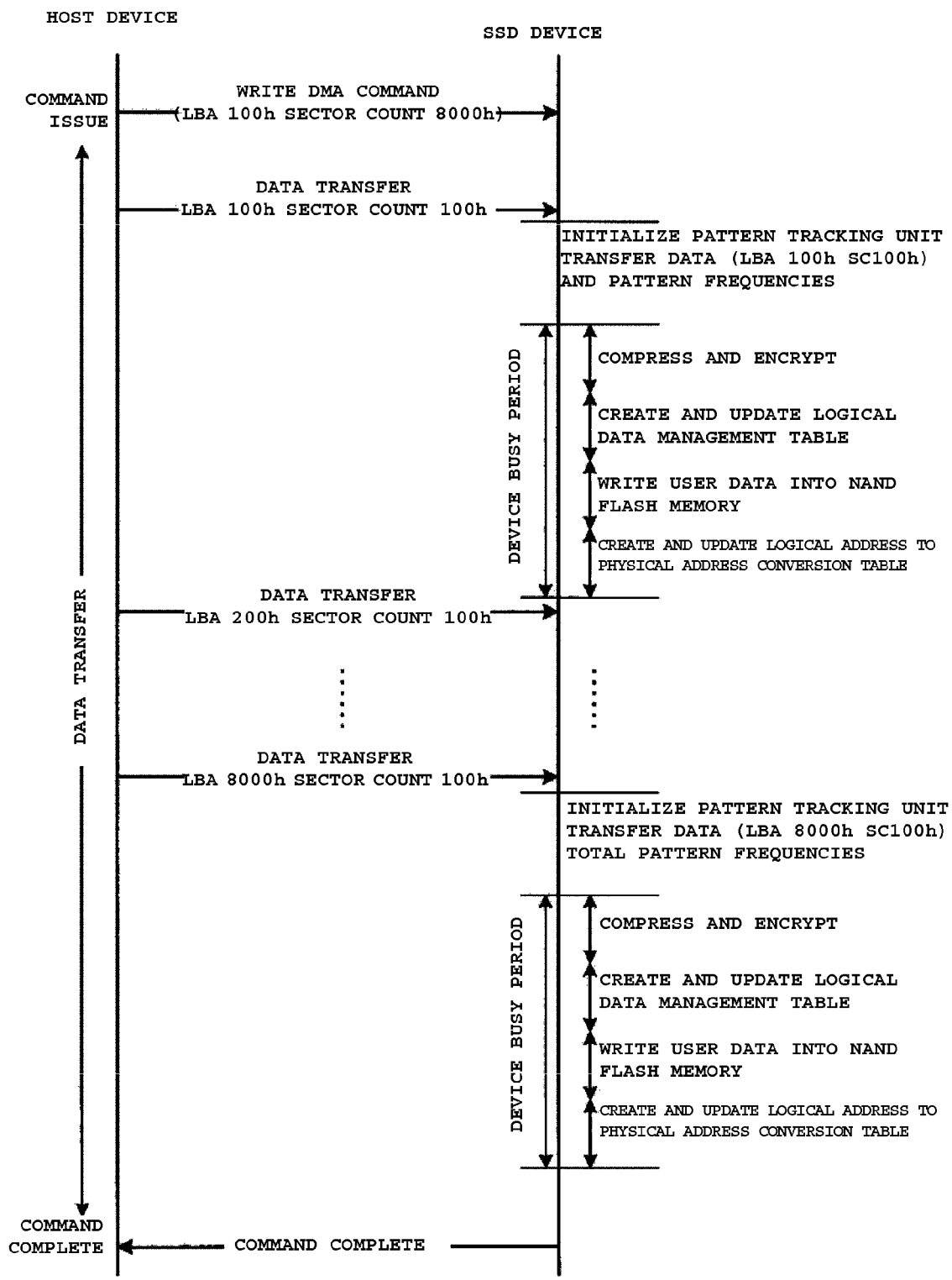
FIG. 12 shows a data flow for explaining another user data writing process according to an embodiment.

Also, as shown in the data flow in FIG. 12, when the unit of the user data writing request from the host device 2 exceeds a predetermined number of sectors (in FIG. 12, 100h sectors), an immediate compression process and an encrypting process may be carried out every predetermined number of sectors (in FIG. 12, 100h sectors). The predetermined number of sectors is assumed to be, for example, a size that does not exceed the size allocated to the area A in cache memory 3.

Figure 13:
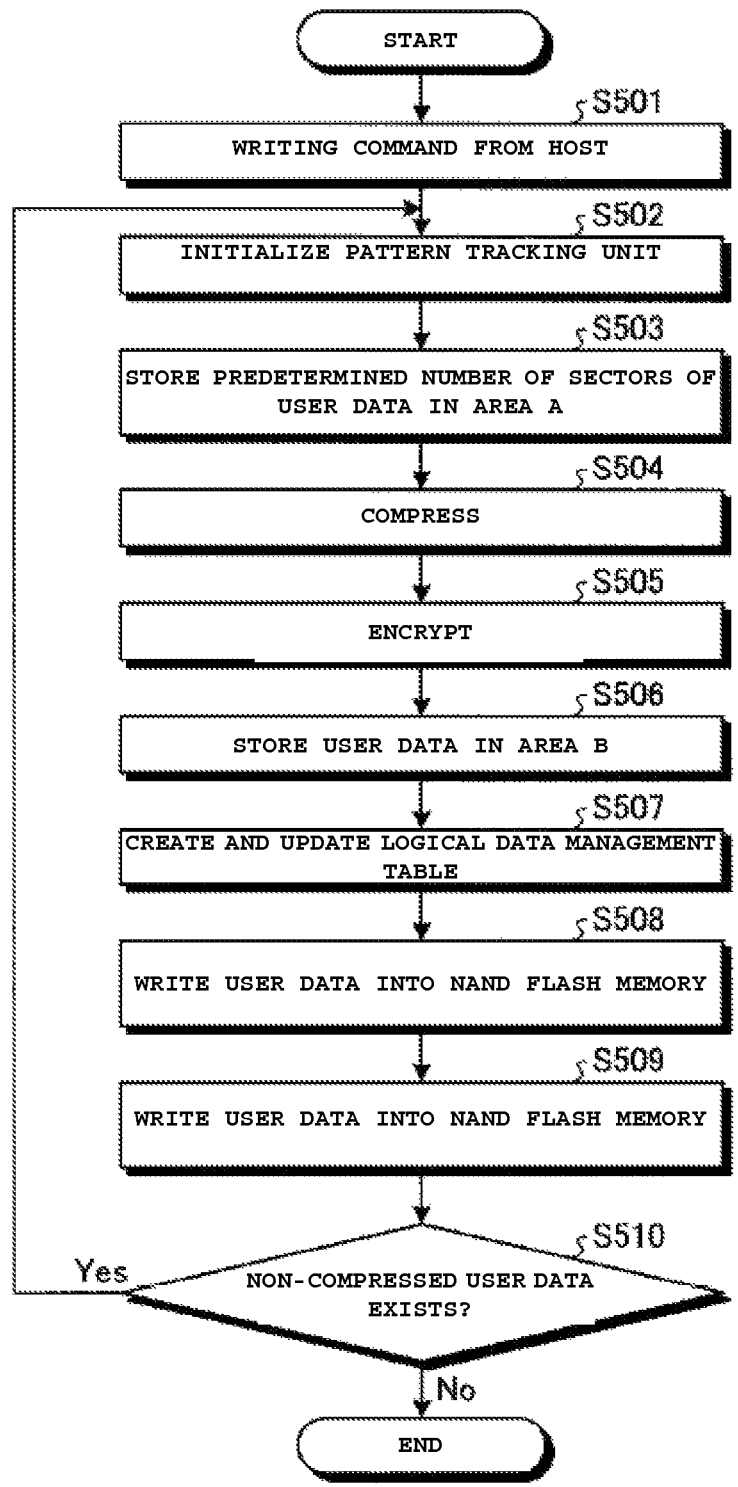
FIG. 13 is a flowchart for explaining another user data writing process according to an embodiment.

FIG. 13 is a flowchart showing the flow of processes in this case. First, the host device 2 requests the SSD 1 to carry out a user data writing process (step S501). The data flow controller 10 initializes the pattern tracking unit 11 (step S502). After that, the pattern tracking unit 11 tracks the frequency of data patterns in the user data of a predetermined number of sectors (for example, 100h sectors), and then the predetermined number of sectors of the user data is stored in the area A in the cache memory 3 (step S503). To control this process, for example, a certain form of data buffer may be provided between the host I/F 12 and the pattern tracking unit 11 in FIG. 1. After that, the compressor 4 compresses the predetermined number of sectors of the user data stored in the area A (step S504) and the encryptor 5 encrypts the user data (step S505). The encrypted user data is stored in the area B in the cache memory 3 (step S506). Then, the "logical data management table" in FIG. 2 developed in the area D with respect to the encrypted user data is created and updated (step S507). The encrypted user data in the area B is written into the NAND flash memory 9 via the NAND flash memory I/F 8 (step S508). Moreover, the "logical address (LBA) to physical address (NAND physical address) conversion table" is created and updated (step S509). Then, whether or not non-compressed user data exists is determined (step S510). If non-compressed user data exists (step S510: Yes), the process returns to step S502. If non-compressed user data does not exist (step S510: No), the process ends.

Data Compaction Process

Figure 8:
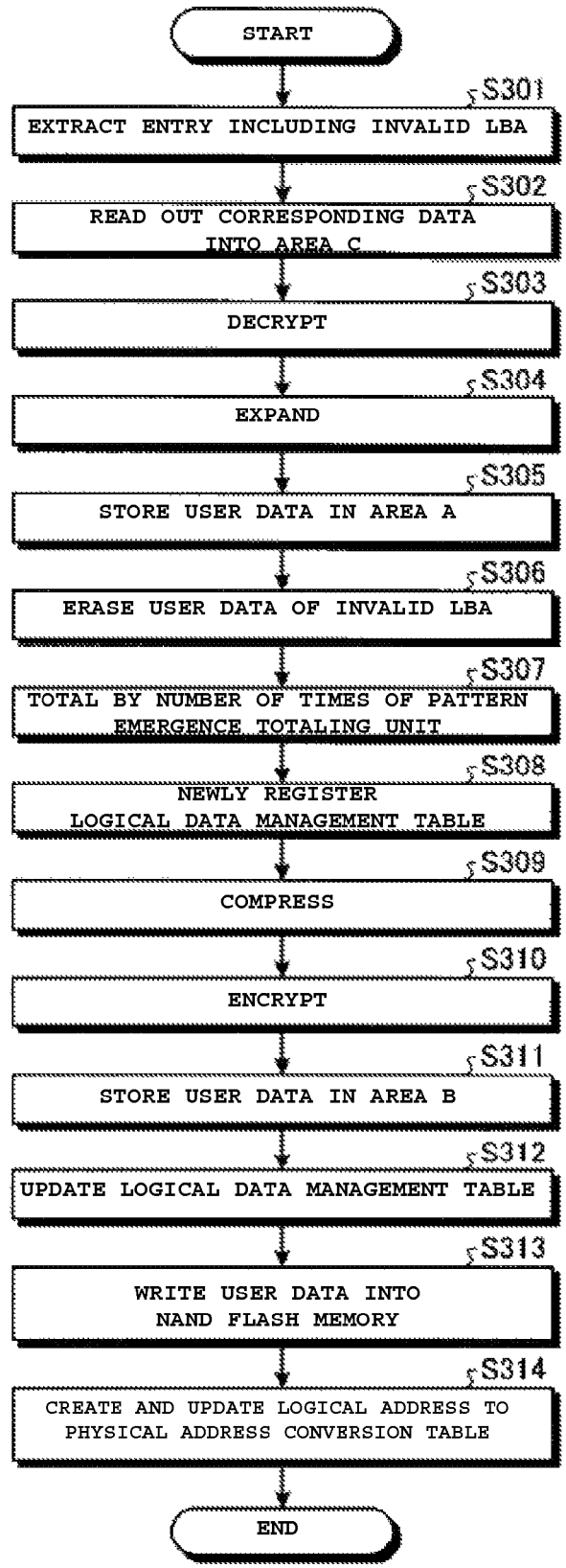
FIG. 8 is a flowchart for explaining a data compaction process according to an embodiment.

Next, a rearrangement method in the case where information of an invalidated LBA exists in the "LBA management maps" which are each managed in the "logical data management table" in FIG. 2 and the "logical address (LBA) to physical address (NAND physical address) conversion table" in FIG. 4 will be described with reference to the flowchart in FIG. 8. This process is referred to so-called data compaction or the like, in which valid data of which LBAs are consecutive are gathered.

First, referring to the "logical data management table" in FIG. 2, an entry including an invalid LBA is extracted (step S301). Then, referring to the "logical address (LBA) to physical address (NAND physical address) conversion table" in FIG. 4 with respect to data including invalid LBAs, the corresponding data is read out into the area C in the cache memory 3 from the NAND flash memory 9 via the NAND flash memory I/F 8 (step S302). The read-out user data is decrypted by the decryptor 7 (step S303) and expanded by the expander 6 (step S304). In the decrypting, the data is decrypted on a page basis. After the decrypting, padding data added to each page for block size alignment in the encrypting process is deleted. In the expansion, the "compression coding conversion table" attached to the "logical data management table" in FIG. 2 needs to be set in the expander 6. The decrypted and expanded user data is stored in the area A in the cache memory 3 (step S305). Of the stored user data, the user data of an LBA that is registered as an invalid LBA in the "LBA management map" is destroyed (step S306). Then, if there is user data of which LBAs are consecutive, the "logical data management table" is reconstructed using this user data as a unit. With respect to each of the user data of which LBAs are consecutive, the pattern tracking process is carried out by the pattern tracking unit 11 (step S307). Then, the result is processed and newly registered as a "compression coding conversion table" appended to the reconstructed "logical data management table" (step S308). The former "logical data management table" including the invalid LBA is deleted.

Then, each of the user data of which LBAs are consecutive is compressed. The procedure is taken as follows. The "compression coding conversion table" attached to the "logical data management table" is set in the compressor 4. Each of the user data of which LBAs are consecutive in the area A is compressed by the compressor 4 (step S309) and encrypted by the encryptor 5 (S310). The encrypted user data is stored in the area B (step S311). Then, the state of the "management information" in the "logical data management table" in FIG. 2 developed in the area D with respect to the encrypted user data is updated to be in a state of being compressed (step S312). The "logical address (LBA) to physical address (NAND physical address) conversion table" in FIG. 4, similarly developed in the area D, is updated and the user data is written in a new area in the NAND flash memory 9 (at the same time, the area in the NAND flash memory 9 before the writing is updated so that the registration in the "logical address (LBA) to physical address (NAND physical address) conversion table" is cleared or the "LBA management map" becomes a free area). Then, the encrypted user data in the area B is written into the NAND flash memory 9 via the NAND flash memory I/F 8 (step S313). Also, in order to reflect the updated state of the area D, the state of the "logical data management table" in the NAND flash memory 9 is updated as a state of being compressed, and writing into the "logical address (LBA) to physical address (NAND physical address) conversion table" in the NAND flash memory 9 is executed (step S314). Such compression after the erasure of the user data of the LBA registered as an invalid LBA in the "LBA management map" may be carried out at the time of wear leveling with respect to the LBA that is invalidated by the above TRIM command.

User Data Reading Process

Figure 9:
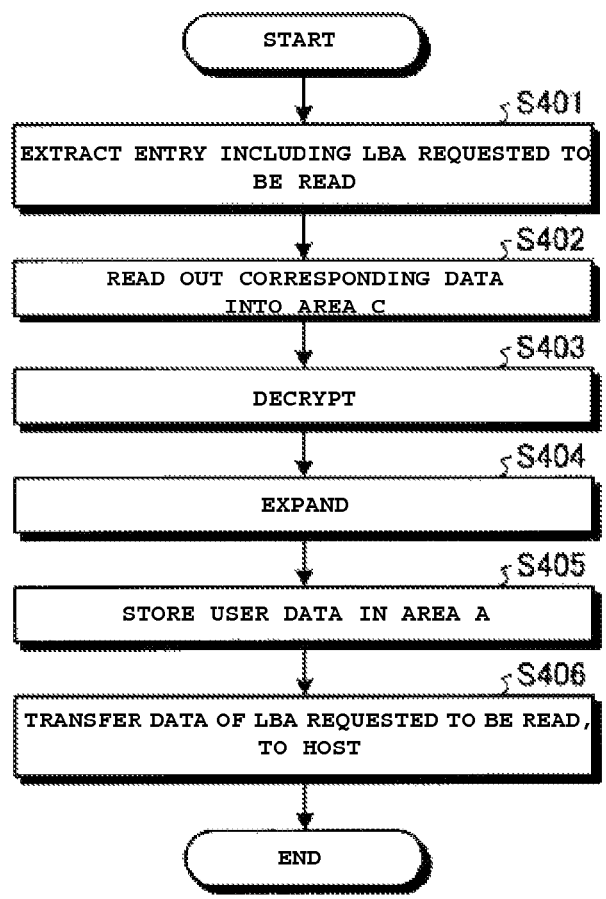
FIG. 9 is a flowchart for explaining a user data reading process according to an embodiment.

Hereinafter, procedures in the case where a user data reading is requested to the SSD 1 by the host device 2 via the host I/F 12 will be described with reference to the flowchart in FIG. 9.

First, an entry including the LBA that is requested to be read is extracted, referring to the "logical data management table" in FIG. 2 (step S401). Then, referring to the "logical address (LBA) to physical address (NAND physical address) conversion table" in FIG. 4 with respect to the LBA that is requested to be read, the corresponding data is read out into the area C in the cache memory 3 from the NAND flash memory 9 via the NAND flash memory I/F 8 (step S402). The read-out user data is decrypted by the decryptor 7 (step S403) and subsequently expanded by the expander 6 (step S404). In the expansion, the "compression coding conversion table" attached to the "logical data management table" in FIG. 2 needs to be set in the expander 6. The decrypted and expanded user data is stored in the area A in the cache memory 3 (step S405). Then, of the user data stored in the area A, only the user data of the LBA that is requested to be read is transferred to the host device 2 via the host I/F 12 (step S406) and the data reading process ends.

Thus, according to this embodiment, in the SSD device having the user data compressing function and the user data encrypting function, encrypting of user data and a compression algorithm with high compression efficiency can be provided without lowering the data access performance of the device.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a non-volatile memory;
a cache memory partitioned into at least a first area, a second area, and a third area;
a compressor configured to compress data;
an encryptor configured to encrypt data;
a decryptor configured to decrypt data;
a data flow controller configured to perform a first process that causes the encryptor to encrypt user data received from a host in a non-compressed state and stored in the first area, and causes the encrypted user data to be written into the non-volatile memory via the second area, and a second process that causes the encrypted user data to be subsequently read out from the non-volatile memory into the third area, causes the decryptor to decrypt the encrypted user data and store the decrypted user data in the first area, causes the compressor to compress the decrypted user data, causes the encryptor to encrypt the compressed user data, and causes the encrypted and compressed user data to be written into the non-volatile memory via the second area; and
a pattern tracking unit configured to track frequencies of data patterns during the first process for use during the second process, wherein
the data flow controller is further configured to maintain a table of user data addresses, and
the frequencies of data patterns are stored in the table and associated with the user data addresses in the table.

2. The memory system according to claim 1,
wherein the compressor uses Huffman coding and the table to perform the compression.

3. The memory system according to claim 1, further comprising:
an expander configured to decompress data,
wherein the data flow controller is configured to perform a third process that causes the decryptor to decrypt encrypted user data stored in the non-volatile memory, and cause the expander to decompress the decrypted user data.

4. The memory system according to claim 3, wherein the first process is a write process, the second process is a background process, and the third process is a read process.

5. The memory system according to claim 4, wherein the background process is one of a wear leveling process and a compaction process.

6. A control method for a memory system including a non-volatile memory, the method comprising:
in response to a command to write data received from a host, encrypting the data and storing the encrypted data in the non-volatile memory;
in response to a trigger from a background process, reading out encrypted data from the non-volatile memory, decrypting the encrypted data, compressing the decrypted data, encrypting the compressed data, and storing the encrypted and compressed data in the non-volatile memory, and
maintaining a table of user data addresses, wherein frequencies of data patterns are stored in the table and associated with the user data addresses in the table.

7. The control method for the memory system according to claim 6, wherein the memory system includes a cache memory having a first area for storing the data received from the host, a second area for storing the encrypted data, and a third area for storing the encrypted data read out from the non-volatile memory.

8. The control method for the memory system according to claim 7, further comprising:
in response to the command to write data, tracking the frequencies of data patterns in the data stored in the first area.

9. The control method for the memory system according to claim 7,
wherein the frequencies of data patterns are used during said compressing.

10. The control method for the memory system according to claim 9, wherein Huffman coding is used during said compressing.

11. The control method for the memory system according to claim 6, further comprising:
in response to a command to read data received from the host, reading out the encrypted and compressed data from the non-volatile memory, decrypting the encrypted and compressed data, decompressing the decrypted data, and returning the decompressed data to the host.

12. The control method for the memory system according to claim 6, wherein the background process is one of a wear leveling process and a compaction process.

13. A memory system comprising:
a non-volatile memory;
a compressor configured to compress data;
an encryptor configured to encrypt data; and
a data flow controller configured to first cause the compressor to compress write data received from a host and then cause the encryptor to encrypt the compressed write data, and cause the compressed and encrypted write data to be stored in the non-volatile memory, the data flow controller being further configured to maintain a table of user data addresses, wherein frequencies of data patterns are stored in the table and associated with the user data addresses in the table.

14. The memory system according to claim 13, further comprising:
an expander configured to decompress data; and
a decryptor configured to decrypt data,
wherein the data flow controller is configured to cause the compressed and encrypted data to be read from the non-volatile memory, cause the decryptor to decrypt the compressed and encrypted data, cause the expander to decompress the decrypted data, and cause the decompressed data to be returned to the host as read data.

15. The memory system according to claim 14, further comprising:
a pattern tracking unit configured to track the frequencies of data patterns in the write data,
wherein the compressor is configured to compress the write data based on the frequencies of data patterns.

16. The memory system according to claim 15, wherein the expander is configured to decompress the decrypted data using the table.

17. The memory system according to claim 15, wherein the compressor employs Huffman coding.

* * * * *